United States Patent
Ruehl et al.

[11] Patent Number: 6,065,915
[45] Date of Patent: May 23, 2000

[54] TANK STORAGE APPARATUS

[76] Inventors: John W. Ruehl, 5425 W. 100 N., Shelbyville, Ind. 46176-9003; Michael L. Ruehl, 3742 N. Forgeus Ave., Tucson, Ariz. 85716

[21] Appl. No.: 09/035,289

[22] Filed: Mar. 5, 1998

Related U.S. Application Data

[60] Provisional application No. 60/039,884, Mar. 5, 1997.

[51] Int. Cl.[7] ..................................................... B60P 7/08
[52] U.S. Cl. ................. 410/36; 410/42; 410/100
[58] Field of Search .................. 410/32, 34, 35, 410/36, 37, 40, 42, 50, 100; 206/391, 443, 446; 211/13.1; 224/405, 568; 114/364

[56] References Cited

U.S. PATENT DOCUMENTS

| | | | |
|---|---|---|---|
| Re. 22,507 | 6/1944 | Heigis | 410/42 X |
| 1,523,252 | 1/1925 | Bradley et al. | 410/50 X |
| 1,993,216 | 3/1935 | Marshall | 410/36 |
| 3,229,825 | 1/1966 | Brown, Jr. | 410/36 |
| 3,581,929 | 6/1971 | Guenard et al. | 410/42 X |
| 5,063,641 | 11/1991 | Chuan | 410/100 X |
| 5,082,464 | 1/1992 | Clink | 114/364 X |
| 5,516,244 | 5/1996 | Baka | 410/36 |
| 5,544,747 | 8/1996 | Horn | 206/443 X |
| 5,755,541 | 5/1998 | Suarez | 410/36 |
| 5,871,316 | 2/1999 | Bills | 410/42 |
| 5,899,331 | 5/1999 | Warren, Jr. | 206/443 |
| 5,901,890 | 5/1999 | Stokes | 224/568 |

FOREIGN PATENT DOCUMENTS

| | | | |
|---|---|---|---|
| 1323953 | 7/1973 | United Kingdom | 410/42 |
| 2196592 | 5/1988 | United Kingdom | 224/568 |

*Primary Examiner*—Stephen T. Gordon
*Attorney, Agent, or Firm*—Bose McKinney & Evans LLP

[57] ABSTRACT

An apparatus is configured to hold and store a plurality of compressed gas cylinders on a surface. The apparatus has a body formed to include a plurality of recessed, contoured portions configured to receive a cylinder. The apparatus also includes a strap coupled to opposite ends of the body. The strap is configured to extend over the plurality of cylinders to hold the cylinders on the body.

20 Claims, 6 Drawing Sheets

TANK STORAGE APPARATUS

This application claims priority to U.S. Provisional Application No. 60/039,884 filed Mar. 5, 1997.

BACKGROUND AND SUMMARY OF THE INVENTION

The present invention relates to an apparatus and method of transporting and storing tanks or cylinders of gases in an organized and managed way. More particularly, the present invention relates to an improved transport and storage device by mechanically encompassing a broad band of the cylindrical shape and further seating via an adjustable strap.

The present invention can be used for securing air or oxygen compressed gas tanks in a car, truck, boat, or on shore. While the present invention is useful for transporting gas cylinders including any type of gas, the present invention is particularly useful for transporting gas tanks for use by scuba divers.

In order to group a plurality of cylindrical objects whether horizontally or vertically requires a rigid method of housing and a stable platform to distribute affective loads. The height-to-base ratio makes cylinders naturally top heavy contributing to the above mentioned conditions. To vertically group cylindrical objects requires the same considerations plus 360 degrees of encompassment around the cordage for optimal organization. Without this the cylinders are influenced by external forces, can move and develop inertia leading to a possibly hazardous situation.

The present invention provides an improved design for transporting and storing cylinders horizontally. Present known methods use soft and degradable materials or narrow devices which lack the stable base to remain upright. The tank storage apparatus of the present invention contacts the horizontal cylindrical objects at extreme ends to absorb biasing forces. The spacing of the centers of half-moon contours on a body portion of the apparatus is such to allow layering, while cylinders are horizontal, in which second and third layers are shifted one half of the diameter of the cylindrical shape and second and third layer rest solely on the previous layer of cylindrical shape. The previous layer creates the previously mentioned half-moon effect and the continuous woven strap maintain the seat in the half-moon contours.

The present invention also allows for vertical tank storage and is improved over present designs in that it contacts with greater surface area and contacts above the center-of-gravity thus reducing the vulnerability to tip.

Another problem associated with transport and storing cylinders is that a stable platform and secure mounting is required yet when not in use this stable and secure device protrudes into often valuable space. The present invention provides a mating profile rail which allows quick and secure indexing of the tank storage apparatus yet the ability to remove and stack the tank storage apparatus and what once was a very generous shape now becomes space efficient and more easily stowable.

Also in the illustrated embodiment, the means for indexing the tank storage apparatus into the mating form and securing with the pins on the ends is illustrated in pictorial detail.

Another aspect of the present invention is that the device can float in water thus allowing easy retrieval if for instance it is knocked off of a dock. The polymeric construction throughout and lack of metallic components also make it resistant to corrosion and also prevents marring of cylinders.

The multiple half-moon contours of the body are configured to hold and store a plurality of cylindrical objects, namely compressed gas cylinders, while stationary or traveling in a machine. The breadth of the apparatus allows a broad stable platform contacting cylindrical surface while cylinders are horizontal and rest on a flat horizontal surface and can be mechanically fastened in space. The apparatus can also cradle cylinders vertically standing by the above mentioned method. Another mounting method can be used by quickly indexing into and out of a mating profile which is permanently mounted on the support surface. A continuous woven strap interconnected to a body of the apparatus wraps around the cylinders and is interlocked via a quickly connectable and disconnectable fastener. The apparatus allows for stackability, thus saving space while not being used. The apparatus is made from a monocoque type construction for optimal mechanical characteristics, and the material allows the product to be buoyant. Also all of the materials are such to resist degradation by natural and chemical elements. The material and construction are such to prevent marring of tank surface and the mounting surface.

Additional objects, features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
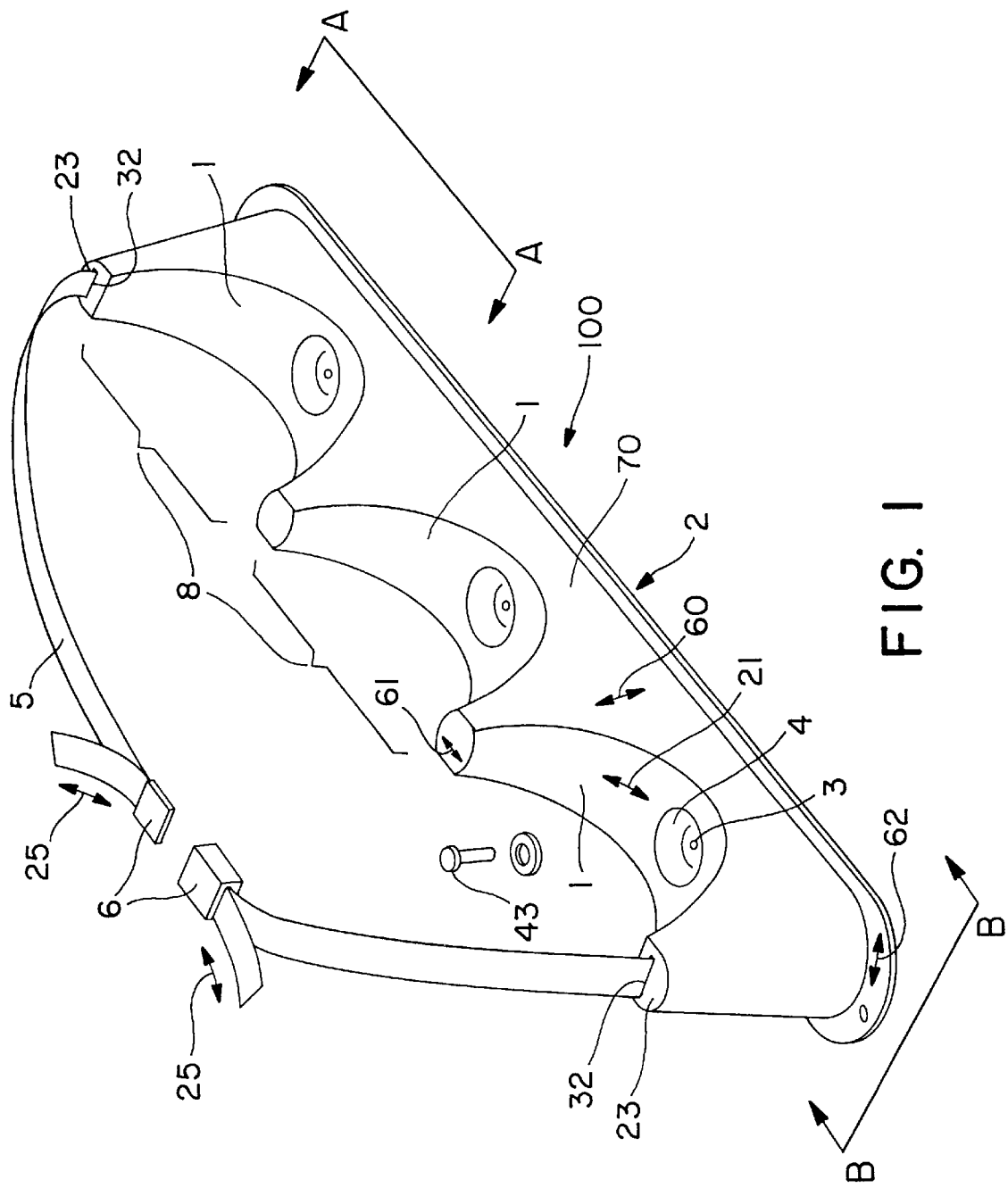
FIG. 1 is an isometric view of the invention in the horizontal illustrating a plurality of half-moon contours, a continuous woven tie-down strap, a quickly connectable and disconnectable fastener, a broad stable base, fastening locations and a perimeter brim.

Referring now to drawings, FIG. 1 illustrates a tank storage apparatus 100 of the present invention. The apparatus 100 includes a plurality 8 of half-moon contours 1, and a series of graduating profiles 21, 60, 61, 62 fashioned from a monocoque 70 construction generating inherent structural capacity. A broad base 2 (refer to FIG. 3), recessed pockets 4 and pierced cross-sections 3 configured to receive mechanical fasteners 43. The elevated surfaces 20 shaped from the monocoque secure the continuous woven tie-down strap 5 with said quick connectable/disconnectable fastener 6 piercing 32 from the extreme ends 23 encompassing the cylindrical shape 9 (refer to FIG. 2). The said quick connectable/disconnectable fastener device 6 allows for continuous woven tie-down strap length adjustment 25 and easy access to the cylindrical shaped tanks 9 (refer to FIG. 2).

Figure 2:
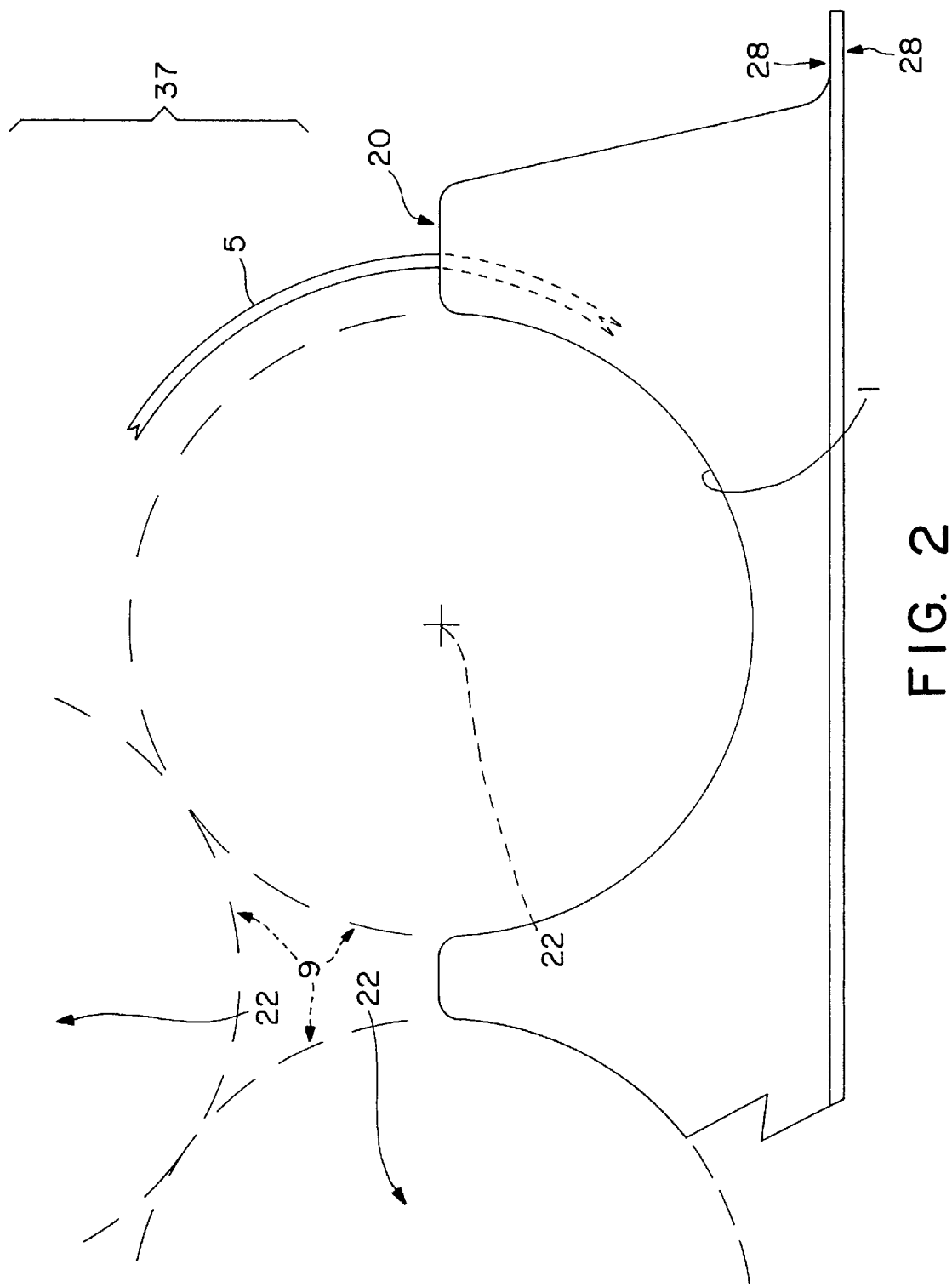
FIG. 2 is a partial view illustrating the half-moon shape with continuous woven tie-down strap and tank relationship also illustrating tank relationships and stacking arrangement.

FIG. 2 illustrates a half-moon contour 1 encompassing a cylinder 9. The woven continuous tie-down strap 5 protrudes from the elevated surface 20 and further encompasses the cylinder 9. The center 22 of the said cylinder 9 is located with respect to other cylinder centers 22 to allow layering 37 or stacking of similar cylindrical shapes on top of each other.

Figure 3:
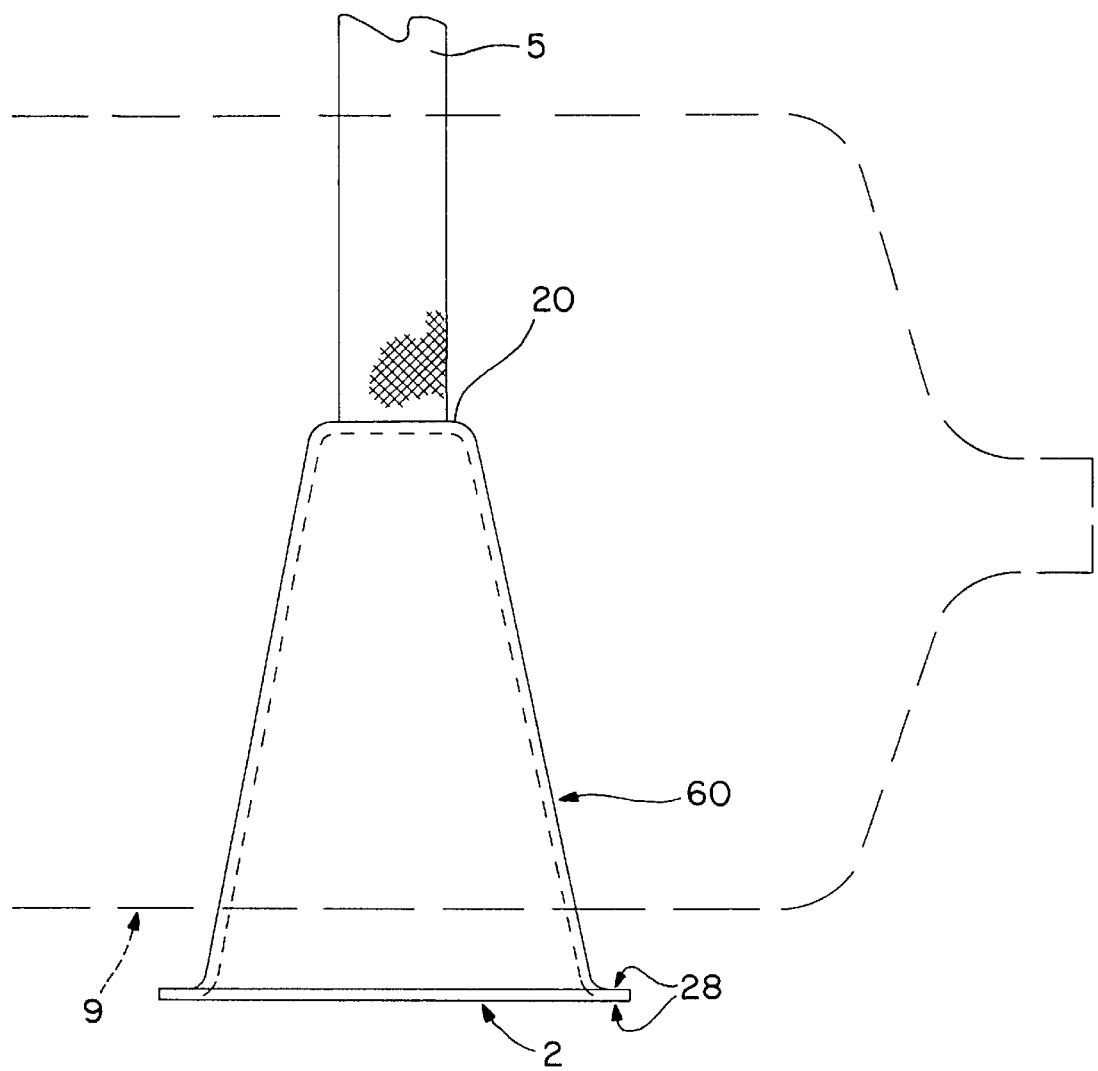
FIG. 3 is an end view illustrating the broad stable base, the continuous woven tie-down strap and tank relationship.

FIG. 3 illustrates the broad base 2 to remain stable and upright and graduating profile 60 up to an elevated surface 20 to encompass the tank cylinder 9. The woven strap 5 extends out of the pierced 32 elevated surface 20 over the tanks to secure the tanks to the apparatus 100.

Figure 4:
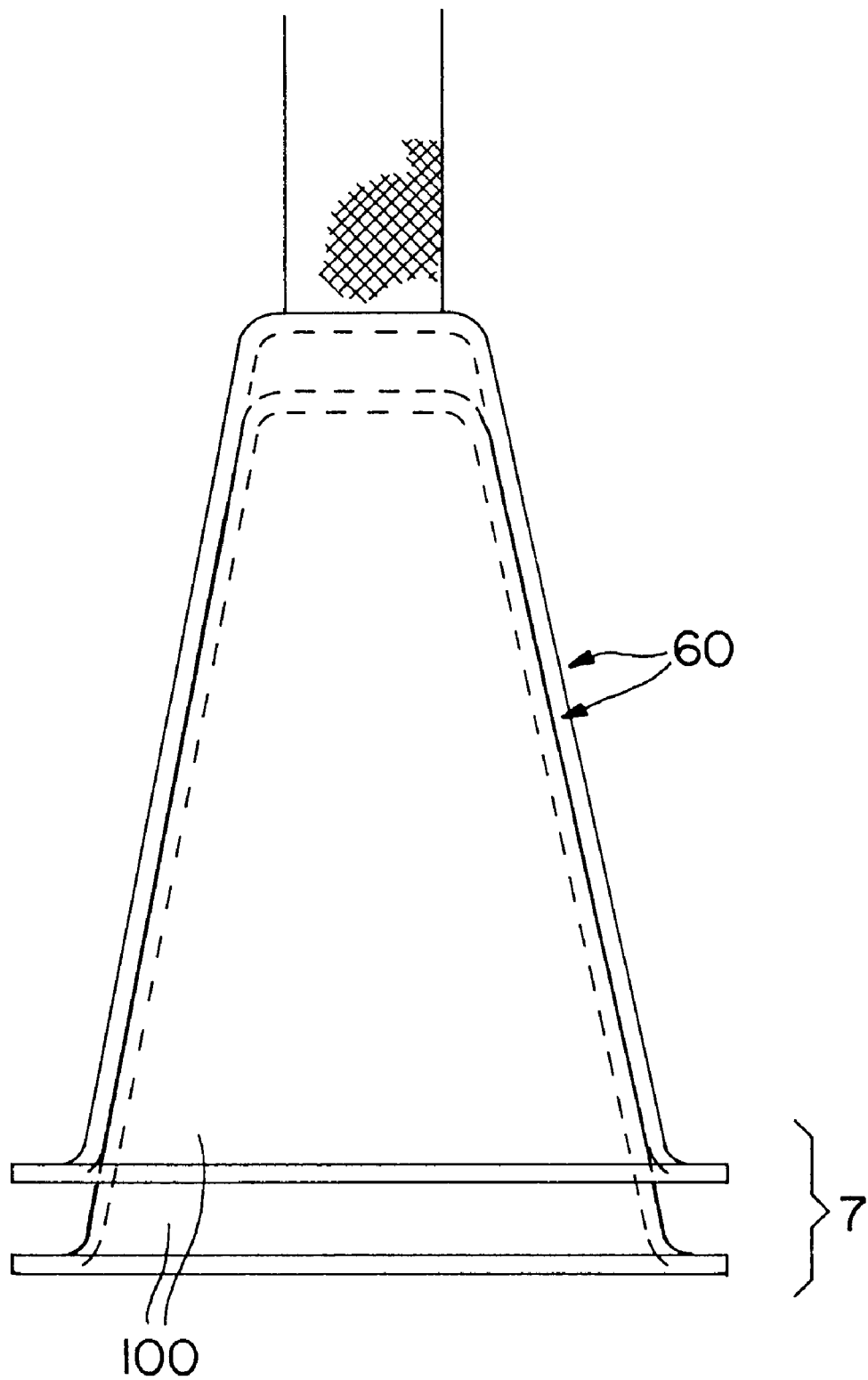
FIG. 4 is an end view illustrating the contacting surfaces and stackability of the tank storage apparatus.

FIG. 4 illustrates the graduating profile 60 and stacking 7 onto a like apparatus 100 thus being stackable. The graduating profile 60 is the contacting surface.

Figure 5:
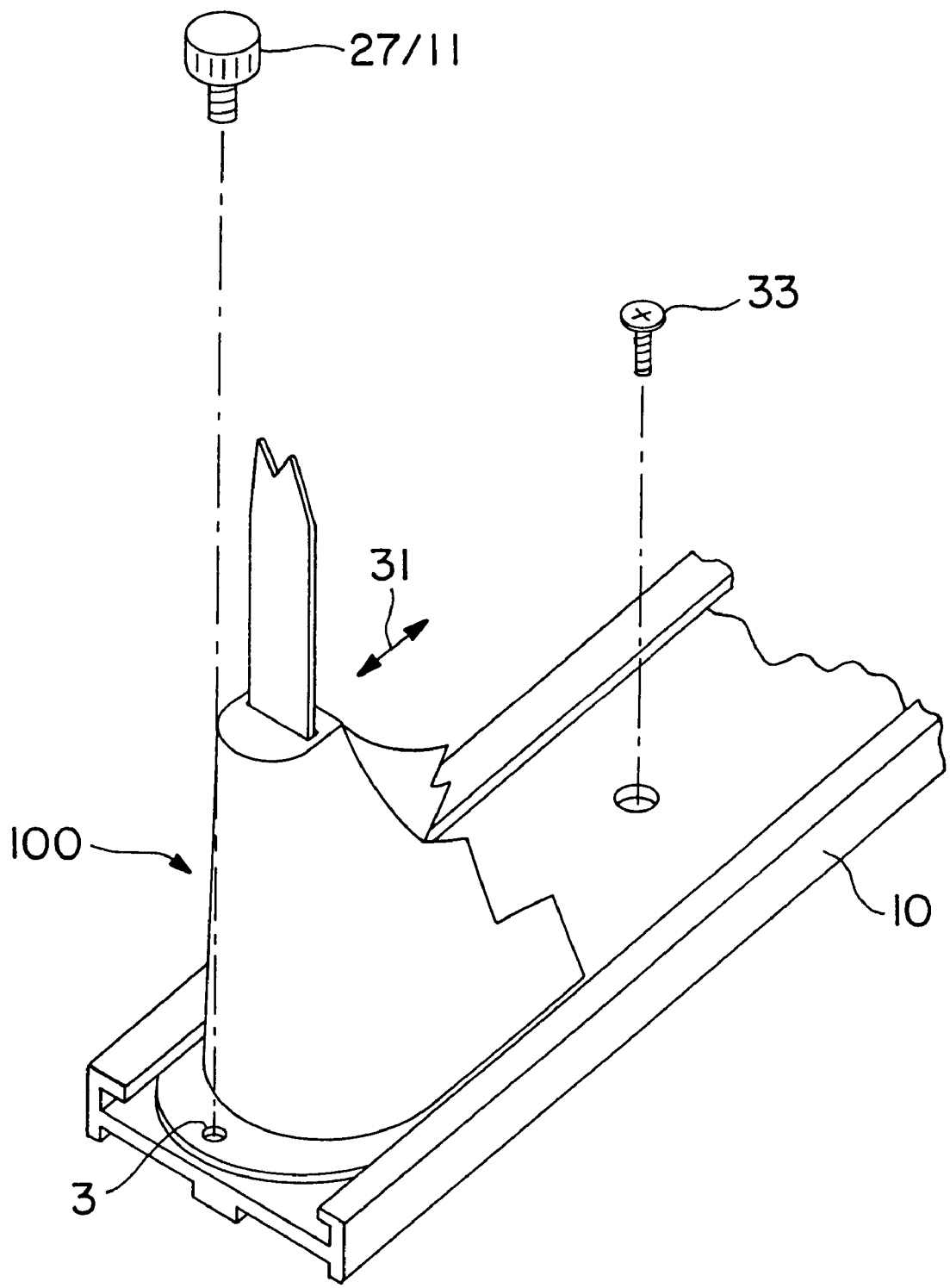
FIG. 5 is an isometric view illustrating the mating profile, hold down fasteners and an indexing device.

FIG. 5 illustrates a section of the invention 100 fully indexed into mating profile 10 revealing profile locking knobs 27 and/or spring loaded detents 11. Also means for mechanical fastening 33 said mating profile 10. Mating profile 10 is constructed of polymeric or metal material maintaining a non-corrosive composition. The mating profile 10 is constructed to withstand biasing forces. The forces generated as indicated by arrow 31 are received by profile indexing devices 27/11.

Figure 6:
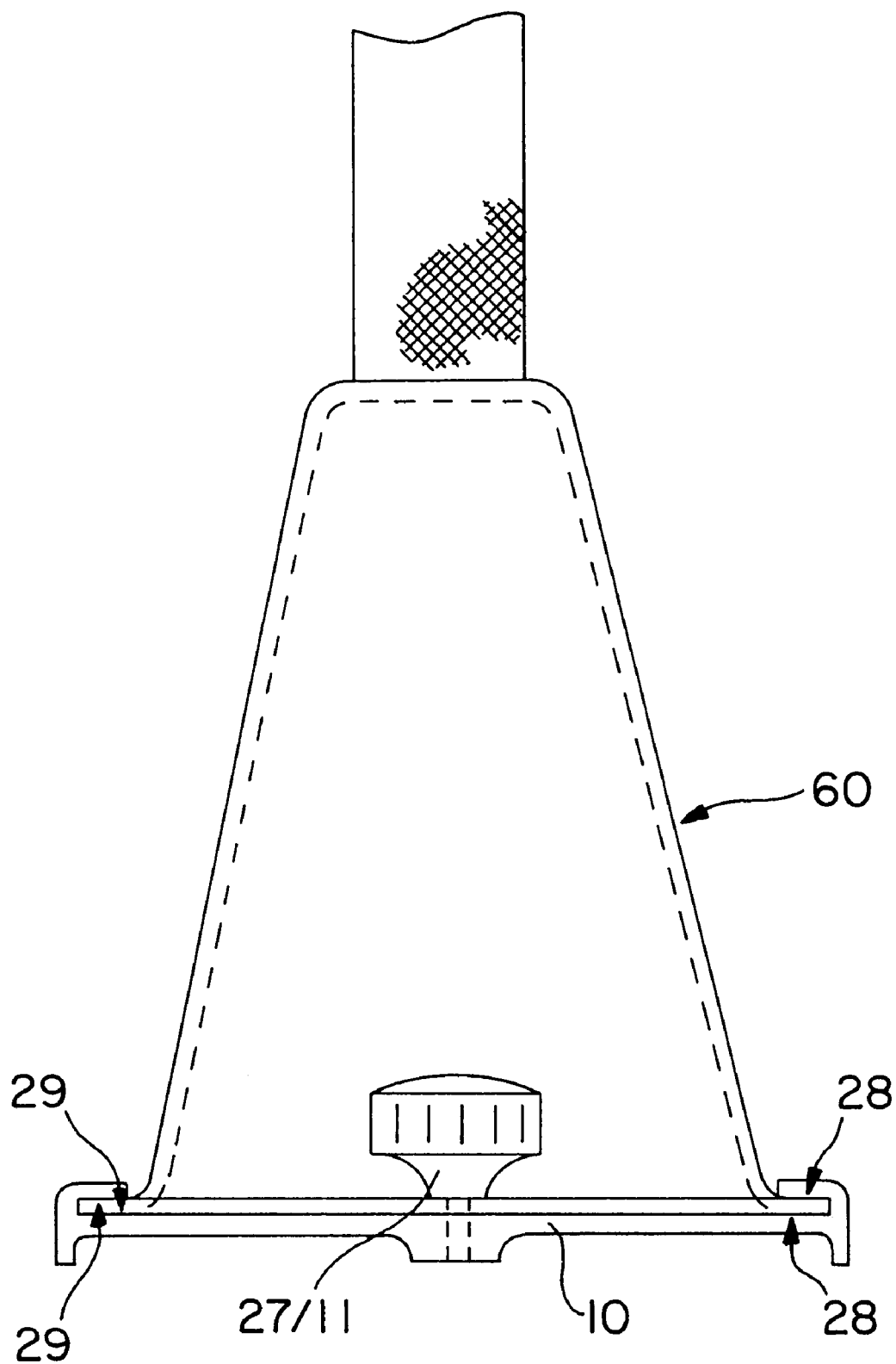
FIG. 6 is an end view of FIG. 5 illustrating the broad stable base, the mating profile and the indexing device.

As illustrated in FIG. 6, the graduating profile 60 forms a parallel brim 28 around perimeter, coinciding with upper and lower parallel surface 29 of mating profile 10 to provide continuous contact to withstand biasing forces perpendicular to said parallel surfaces 29.

After the mating profile track 10 is secured to an appropriate structure with fasteners 33, the apparatus 100 of the present invention slides into the track formed by brim or flange 28. An edge of base 2 of apparatus 100 is trapped within the track defined on the mating profile 10.

The apparatus 100 can be mounted on a vertical or horizontal support surface. One or more of the tank storage apparatus 100 can be mounted side by side to permit storing additional tanks. In addition, the apparatus 100 can be used for horizontal supporting of tanks. In this arrangement, two of the tank support apparatus 100 are mounted parallel to each other in a spaced apart arrangement so that one apparatus 100 is located adjacent each end of the tank or cylinder 9.

Illustratively, the body of apparatus 100 is made from a black ABS material which is impact resistant and resists fading and weather checking. However, it is understood that any suitable material may be used. The material is also buoyant so that it will float if it is accidentally dropped into the water.

Although the invention has been described in detail with reference to a certain illustrated embodiment, variations and modifications exist within the scope and spirit of the present invention as defined in the following claims.

What is claimed is:

1. A gas cylinder storage apparatus comprising:
    a body including a base and a plurality of projections extending upwardly from the base, adjacent ones of said projections being connected by a concave surface configured to receive a cylinder thereon, the base-having a width greater than a width of the projections so that the body has a generally conical cross sectional shape; and
    a strap coupled to the body, the strap being configured to extend over the plurality of cylinders to hold the cylinders on the body.

2. The apparatus of claim 1, wherein the body includes flange formed integrally with and extending outwardly from the base.

3. The apparatus of claim 2, further comprising a track configured to be coupled to a first surface, the track being configured to receive the flange of the base to couple the body to the track.

4. The apparatus of claim 3, further comprising a quick release fastener configured to couple the body to the track.

5. The apparatus of claim 4, wherein the quick release fastener is a threaded knob coupled to the body and configured to engage a portion of the track.

6. The apparatus of claim 4, wherein the quick release fastener is a spring loaded detent coupled to the body and configured to engage a portion of the track.

7. The apparatus of claim 3, further comprising a fastener configured to secure the track to the first surface.

8. The apparatus of claim 3, wherein the track includes an open end configured receive the body.

9. The apparatus of claim 1, wherein the strap has an adjustable length.

10. The apparatus of claim 1, wherein the plurality of projections are spaced apart by a predetermined distance so that when the cylinders are received between the projections, additional cylinders can be stacked upon a first layer of cylinders located on the body.

11. The apparatus of claim 1, wherein the body is formed from a buoyant material.

12. The apparatus of claim 1, wherein the body includes a wall having a substantially uniform thickness having an open bottom surface to permit stacking of the body on to another identically shaped body.

13. A gas cylinder storage apparatus configured to be coupled to a first surface, the apparatus comprising:
    a track configured to be coupled to the surface;
    a body including a base, a plurality of projections extending upwardly from the base, and a flange formed integrally with and extending outwardly from the base, adjacent over of said projections being connected by a concave surface configured to receive a cylinder thereon, the track being configured to receive the flange of the base to couple the body to the track;
    a strap coupled to the body, the strap being configured to extend over the plurality of cylinders to hold the cylinders on the body; and
    a quick release fastener configured to couple the body to the track.

14. The apparatus of claim 13, wherein the quick release fastener is a threaded knob coupled to the body and configured to engage a portion of the track.

15. The apparatus of claim 13, wherein the quick release fastener is a spring loaded detent coupled to the body and configured to engage a portion of the track.

16. The apparatus of claim 13, wherein the track includes an open end configured receive the body.

17. The apparatus of claim 13, wherein the base has a width greater than a width of the projections so that the body has a generally conical cross sectional shape.

18. The apparatus of claim 13, wherein the body is formed from a buoyant material.

19. The apparatus of claim 13, wherein the body includes a wall having a substantially uniform thickness having an open bottom surface to permit stacking of the body on to another identically shaped body.

20. The apparatus of claim 13, wherein the first surface is a vertically extending surface.

* * * * *